United States Patent [19]

Smith et al.

[11] Patent Number: 4,795,279

[45] Date of Patent: Jan. 3, 1989

[54] ROLLING BALL SEPARATOR

[75] Inventors: Dennis W. Smith; Peter E. Jacobson, both of Phoenix, Ariz.

[73] Assignee: Honeywell, Inc., Minneapolis, Minn.

[21] Appl. No.: 85,671

[22] Filed: Aug. 14, 1987

[51] Int. Cl.[4] .......................................... F16C 33/372
[52] U.S. Cl. ..................................... 384/450; 384/522
[58] Field of Search ............... 384/450, 522, 553, 554, 384/555, 550

[56] References Cited

U.S. PATENT DOCUMENTS

| | | | |
|---|---|---|---|
| 951,847 | 3/1910 | Seubert | 384/522 |
| 1,287,225 | 12/1918 | Cheney | 384/522 |
| 3,124,396 | 3/1964 | Barager | 384/522 |
| 4,372,633 | 2/1983 | Allen et al. | 310/232 |
| 4,565,457 | 1/1986 | Flander | 384/450 |

*Primary Examiner*—Lenard A. Footland

*Attorney, Agent, or Firm*—Howard Paul Terry

[57] ABSTRACT

A ball bearing includes an outer ring having a rotation axis and an inner ring, which rotates relative to the outer ring, and a plurality of bearing balls disposed between the outer ring and the inner ring. A plurality of rollers are peripherally disposed between the bearing balls and are radially disposed between the outer ring and the inner ring. First and second axially spaced tracks are disposed on opposite sides of the bearing balls for supporting the rollers. First and second plates, which support the first and second tracks, are connected to and supported by the inner ring. The bearing balls and roller portions have respective radial dimensions, and the outer ring and inner ring and roller tracks have respective radial dimensions. Such radial dimensions can be specified using given formulas, in order to provide substantially pure rolling friction, without any sliding friciton.

4 Claims, 2 Drawing Sheets

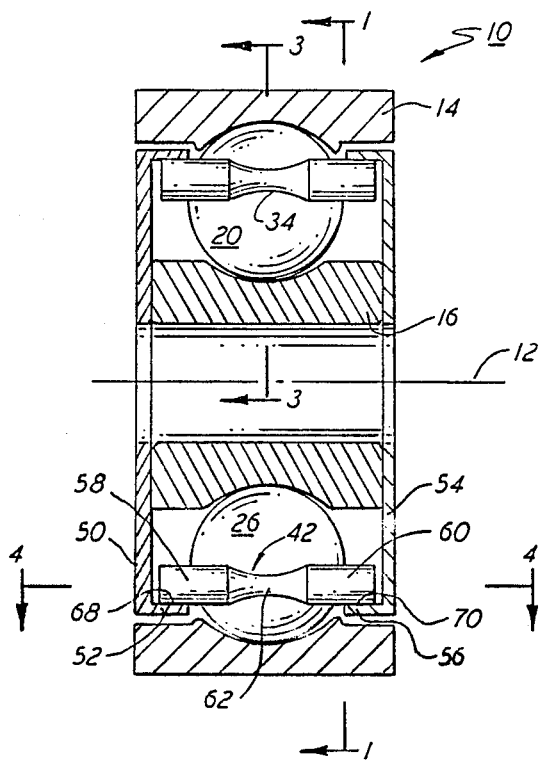
FIG. 2
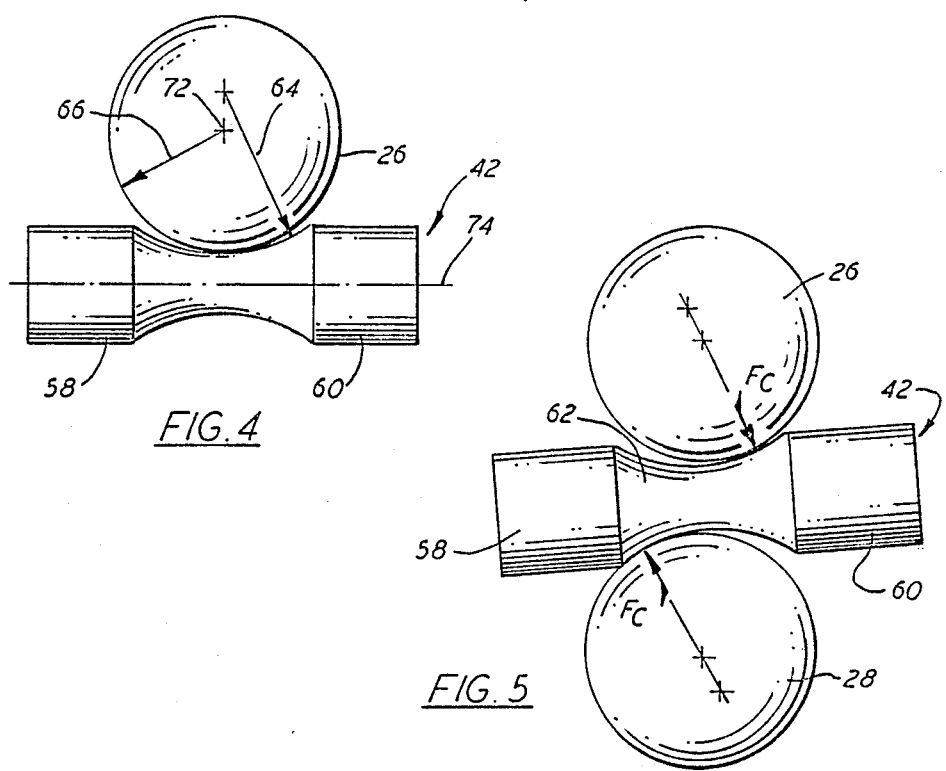
FIG. 4
FIG. 5

ROLLING BALL SEPARATOR

BACKGROUND OF THE INVENTION

The invention relates to a ball bearing having separators, and in particular, the invention relates to a ball bearing having roller separators.

The prior art ball bearing includes an outer ring having an axis, an inner ring rotatable relative to the outer ring about the axis, a plurality of bearing balls, and a cage separator with respective pockets for the bearing balls.

A problem with the prior art ball bearing is that there is a relatively large sliding friction at the interface of each bearing ball and the cage which causes a relatively large bearing torque.

The prior art U.S. Pat. No. 4,372,633 describes a substantially zero friction electrical conductor assembly and provides a concept of eliminating sliding friction by using substantially pure rolling friction at the interfaces of its parts.

SUMMARY OF THE INVENTION

According to the present invention, a ball bearing is provided. The ball bearing includes an outer ring having an axis, an inner ring rotatable relative to the outer ring about the axis, a plurality of bearing balls radially disposed between the rings, a plurality of roller separators peripherally disposed between the bearing balls, and a pair of tracks for supporting the roller separators.

By using the plurality of roller separators peripherally disposed between the bearing balls and by using the pair of tracks for supporting the roller separators, instead of the cage separator, sliding friction and its bearing torque can be minimized. Also, the concept of substantially pure rolling friction at the interfaces of its parts can be applied.

The above advantages and subsequent description will be more readily understood by reference to the following drawings.

BRIEF DESCRIPTION OF THE DRAWINGS

FIG. 2 is a section view as taken along the line 2—2 of FIG. 1;

FIG. 4 is a schematic section view along the line 4—4 of FIG. 1; and

FIG. 5 is an alternate section view similar to FIG. 4.

DESCRIPTION OF THE PREFERRED EMBODIMENT

Figure 1:
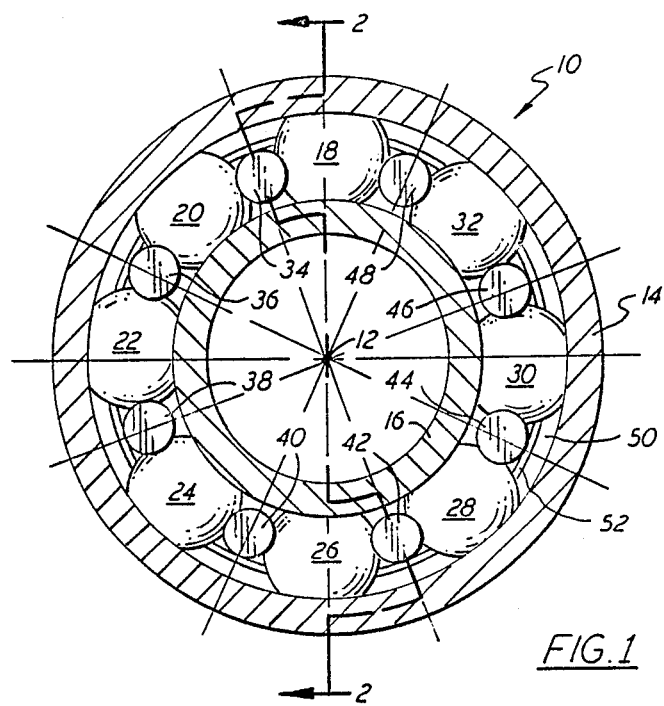
FIG. 1 is a vertical section view of a bearing according to the invention as taken along the line 1—1 of FIG. 2.

In FIG. 1, a ball bearing 10 is shown. Bearing 10, which has a rotation axis 12, includes an outer ring or race 14 and an inner ring or race 16. Bearing 10 also includes a plurality of identical bearing balls 18, 20, 22, 24, 26, 28, 30, 32, which are disposed between outer ring 14 and inner ring 16 in a radial direction.

Bearing 10 also includes a plurality of identical rolling elements, or roller separators, or rollers 34, 36, 38, 40, 42, 44, 46, 48, which are alternately disposed between bearing balls 18, 20, 22, 24, 26, 28, 30, 32, in a peripheral direction.

In FIG. 2, inner ring 16 has a left side plate 50, which is fixedly connected thereto. Plate 50 has a ring-shaped roller track 52, which is integral therewith. Inner ring 16 also has a right side plate 54, which is fixedly connected thereto. Plate 54 has a ring-shaped roller track 56, which is integral therewith.

In FIG. 2, roller 42, which is a typical roller, has a left cylindrical portion 58, a right cylindrical portion 60, and a recessed center portion 62.

In FIG. 4, the radius 64 of recessed center portion 62 of typical roller 42 is slightly larger than the radius 66 of typical bearing ball 26, as explained hereafter.

Figure 3:
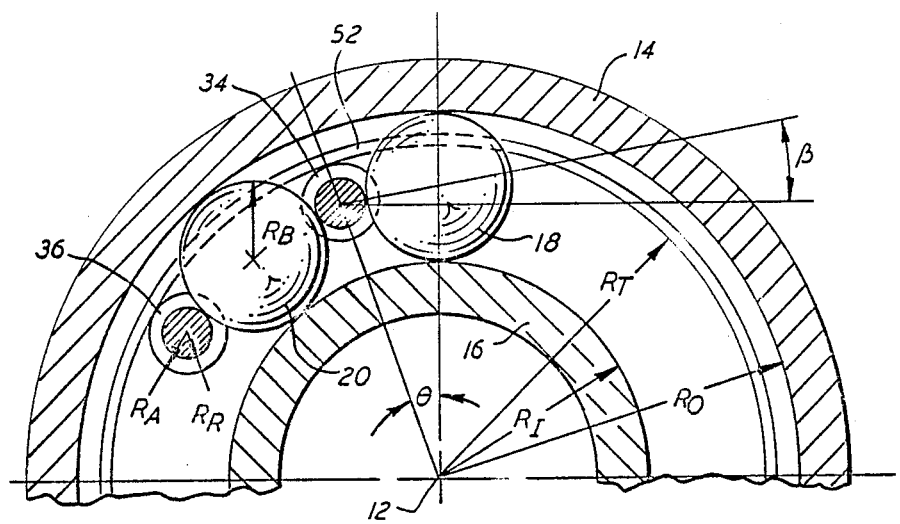
FIG. 3 is a schematic view of a portion of FIG. 1 as taken along the line 3—3 of FIG 2.

In FIG. 3, which is a schematic view of a portion of FIG. 1, the component dimensional relationships are shown. In FIG. 2, track 52 has a radially inner rolling surface 68 on which left cylindrical portion 58 rolls, and has a radially inner rolling surface 70 on which right cylindrical portion 60 rolls.

In FIGS. 1 and 2, typical roller 42 is located by contacts with two adjacent balls 26, 28 along its center portion 62, and with tracks 52, 56 at respective left portion 58 and right portion 60. By appropriate selection of track and roller diameters, it is possible to design a bearing in which there is pure rolling at each point of relative motion. Since rolling interfaces have less friction and wear than sliding interfaces, in general, the overall drag torque of bearing 10 is minimized.

In FIG. 3, the dimensions of typical bearing balls 18, 20 and rollers 34, 36 and track surface 68 are shown. The following equations 1 and 2 may be immediately derived from the geometric relationships represented in FIG. 3. Equation 3 is derived from matching velocities at contacting interfaces, to insure pure rolling.

$$\cos \beta = \frac{(R_T - R_A) \sin \theta}{(R_R + R_B)} \quad \text{EQ. 1}$$

$$\sin \beta = \frac{(R_I + R_B) - (R_T - R_A) \cos \theta}{(R_R + R_B)} \quad \text{EQ. 2}$$

$$\frac{R_R}{R_A} = \frac{\cos (\theta - \beta) + \sin \theta}{2 \frac{R_T}{R_I} \cos (\theta - \beta) - \cos \beta} \quad \text{EQ. 3}$$

Where:
$R_T$=radius of the roller track
$R_I$=radius of the inner race
$R_B$=radius of the ball
$R_R$=radius of the roller at the point of contact between the roller and the ball
$R_A$=radius of the roller at the point of contact between the roller and the roller track
$\theta$=angle between bearing radii that intersect ball and roller centers, [$\theta=(360 \div N)/2$] where N=number of balls
$\beta$=the complement of the angle between the line connecting the centers of the ball and roller, and the line connecting the centers of the ball and inner ring All of the independent parameters ($R_T$, $R_I$, $R_B$, $R_R$, $R_A$ and $\theta$) may be manipulated using the relationships of equations 1, 2 and 3, but in practice there are often constraints on some of the parameters. A common example would have values for $R_I$, $R_B$, $R_T$ and $\theta$ given. In this case the unknowns are $R_R$ and $R_A$. Equations 4 and 5 are expressions for $R_R$ and $R_A$, derived from equations 1, 2 and 3.

$$R_R = \frac{(R_I + R_B)\sin\Theta}{\cos(\beta - \theta)} - R_B \qquad \text{EQ. 4}$$

$$R_A = R_T - \frac{(R_I + R_B)\cos\beta}{\cos(\beta - \Theta)} \qquad \text{EQ. 5}$$

In FIGS. 4 and 5, the design of roller 42, which is a typical roller, is important to assure alignment stability during operation. In order to assure that roller 42 does not slide axially and maintains its longitudinal axis 74 parallel to the rotational axis 12 of the bearing 10, radius 64 is machined into roller 42 that is only slightly larger than that radius 66 of ball 26 it is rolling on. FIG. 4 shows a typical roller 42 in contact with an adjacent ball 26. Note that this cut-away view in FIG. 4 is in the plane that passes through the ball center 72 and roller center 74. The radius of curvature 64 of roller 42 is generally 52 to 55% of the ball diameter. The effect of this intimacy between the ball and roller is that if a disturbing force is applied to the roller, such as might be caused by a piece of debris on the roller track, a restoring force, opposing the disturbance, will be generated between the ball and the roller. FIG. 5 illustrates the generation of a restoring moment to roller 42 that has been angularly displaced, as it might from encountering a retarding force at one of the two track contacts. The ball/roller contact forces $F_C$ form a restoring moment since they no longer act along the line of centers.

In this way, the invention provides separation and relative positioning for the rollers and bearing balls in bearing 10. This separation is accomplished with small rollers 34, 36, 38, 40, 42, 44, 46, 48, whose center portions 62 roll on adjacent bearing balls 18, 20, 22, 24, 26, 28, 30, 32, contacting them outside the pitch diameter, while their left end portions 58 and right end portions 60, which are different in diameter from center portion 62, roll on respective surfaces 68, 70 of tracks 52, 56.

Bearing 10 provides pure rolling at all interfaces, so that drag torque is minimized. As specified in the aforementioned equation 3, matching velocities are provided at all contacting interfaces, to insure pure rolling and to avoid sliding friction.

While the invention has been described in its preferred embodiments, it is to be understood that the words which have been used are words of description rather than limitation and that changes may be made within the purview of the appended claims without departing from the true scope and spirit of the invention in its broader aspects.

For example, rollers 34, 36, 38, 40, 42, 44, 46, 48, may be located inside the pitch diameter of bearing balls 18, 20, 22, 24, 26, 28, 30, 32, and may contact a pair of tracks that are connected to outer ring 14. As another example, roller bearings can be used in place of bearing balls 18, 20, 22, 24, 26, 28, 30, 32.

The embodiments of an invention in which an exclusive property or right is claimed are defined as follows:

1. A bearing comprising:
an outer ring having an axis;
an inner ring for rotation relative to the outer ring about the axis;
a plurality of bearing balls radially disposed between the outer ring and the inner ring;
a plurality of rollers peripherally disposed beteween the bearing balls and radially disposed between the outer ring and the inner ring;
a pair of axially spaced tracks for supporting the plurality of rollers, said pair of tracks including a first track fixedly connected to the inner ring and a second track fixedly connected to the inner ring;
said pair of tracks having respective side plates disposed axially outwardly and on opposite sides of said bearing balls, said plates being fixedly connected to said inner ring, and said tracks having respective bearing surfaces;
each said roller having a left cylindrical portion and a right cylindrical portion and a recessed center portion;
said left cylindrical portion being arranged to bear against the first track bearing surface;
said right cylindrical portion being arranged to bear against the second track bearing surface;
said recessed center portion being arranged to bear against an adjacent pair of the bearing balls disposed at opposite sides thereof; and
said center portion having a ring shaped recess having an arcuate section with a radius which is slightly larger than the radius of the bearing ball; wherein
the center portion radius measures between 52 percent to 55 percent of the diameter of the bearing ball.

2. A bearing comprising:
an outer ring having an axis;
an inner ring for rotation relative to the outer ring about the axis;
a plurality of bearing balls radially disposed between the outer ring the inner ring;
a plurality of rollers peripherally disposed between the bearing balls and radially disposed between the outer ring and the inner ring;
a pair of axially spaced tracks for supporting the plurality of rollers, said pair of tracks including a first track fixedly connected to the inner ring and a second track fixedly connected to the inner ring;
said pair of tracks having respective side plates disposed axially outwardly and on opposite sides of said bearing balls, said plates being fixedly connected to said inner ring, and said tracks having respective bearing surfaces.
each said roller having a left cylindrical portion and a right cylindrical portion and a recessed center portion;
said left cylindrical portion being arranged to bear against the first track bearing surface;
said right cylindrical portion being arranged to bear against the second track bearing surface; and
said recessed center portion being arranged to bear against an adjacent pair of the bearing balls disposed at opposite sides thereof; wherein
the roller center portion has a radius $R_R$ located at a point of contact between the roller and the bearing ball and disposed in a plane extending through spherical centers of the bearing balls, and wherein the radius is defined by the following formula:

$$R_R = \frac{(R_I + R_B)\sin\theta}{\cos(\beta - \theta)} - R_B$$

where:
$R_I$ = radius of inner race
$R_B$ = radius of the bearing ball
$\theta$ = angle between bearing radii that intersect ball and roller centers, $[\theta = (360° \div N)/2]$ where N = number of bearing balls $\beta$ = the complement of the angle between the line connecting the centers of the ball and roller, and the line connecting the centers of the ball and inner ring.

3. A bearing comprising:
an outer ring having an axis;
an inner ring for rotation relative to the outer ring about the axis;
a plurality of bearing elements radially disposed between the outer ring and the inner ring;
a plurality of rollers peripherally disposed between the bearing elements and radially disposed between the outer ring and the inner ring;
a pair of axially spaced tracks for supporting the plurality of rollers, said pair of tracks including a first track fixedly connected to one ring for support and a second track fixedly connected to the one support ring;
said pair of tracks having respective side plates disposed axially outwardly and on opposite sides of said bearing elements, said plates being fixedly connected to said one support ring, and said tracks having respective bearing surfaces,
each said roller having a left cylindrical portion and a right cylindrical portion and a recessed center poriton;
said left cylindrical portion being arranged to bear against the first track bearing surface;
said right cylindrical portion being arranged to bear against the second track bearing surface;
said recessed center portion being arranged to bear against an adjacent pair of the bearing elements disposed at opposite sides thereof; wherein
the roller cylindrical portion at each end of the roller has a radius $R_A$ at the point of contact between the roller and the roller track, and wherein said radius is defined by the following formula;

$$R_A = R_T - \frac{(R_I + R_B) \cos \beta}{\cos (\beta - \theta)}$$

where:
$R_T$ = radius of the roller track
$R_I$ = radius of the inner race
$R_B$ = radius of the bearing element
$\theta$ = angle between bearing radii that intersect element and roller centers, $[\theta = (360° \div N)/2]$ where N = number of bearing elements
$\beta$ = the complement of the angle between the line connecting the centers of the element and roller, and the line connecting the centers of the element and inner ring.

4. The bearing of claim 3 wherein
the bearing elements are bearing balls, and wherein the one support ring is the inner ring.

* * * * *